Aug. 29, 1950 T. F. SCHLICKSUPP 2,520,785
ROTARY AND SLIDING BALL BEARING
Filed Nov. 21, 1946 2 Sheets-Sheet 1

INVENTOR
*Theodore F. Schlicksupp*
BY
*Pennie, Edmonds, Morton & Barrows*
ATTORNEYS Aug. 29, 1950 T. F. SCHLICKSUPP 2,520,785
ROTARY AND SLIDING BALL BEARING
Filed Nov. 21, 1946 2 Sheets-Sheet 2

INVENTOR
Theodore F. Schlicksupp
BY
ATTORNEYS

Patented Aug. 29, 1950

2,520,785

UNITED STATES PATENT OFFICE 2,520,785

ROTARY AND SLIDING BALL BEARING

Theodore F. Schlicksupp, Long Island City, N. Y.

Application November 21, 1946, Serial No. 711,440

3 Claims. (Cl. 308—6)

1

This invention relates to ball bearings.

It is frequently desirable to mount a shaft in a bearing so that the shaft can either rotate or slide rectilinearly in the bearing or the bearing can either rotate or slide on the shaft.

The principal object of the invention is to provide an improved antifriction ball bearing for shafts which will permit either relative rotary movement or relative rectilinear sliding movement between the shaft and bearing.

A rotary and sliding ball bearing embodying the invention is illustrated in the accompanying drawings, in which:

Figure 1 is a cut away perspective view of the bearing;

Figs. 2-4 illustrate the construction of the sleeve portion of the ball race member; Fig. 2 being a transverse section through such sleeve portion; Fig. 3 a longitudinal section through it; and Fig. 4 a development of it;

Figure 7:
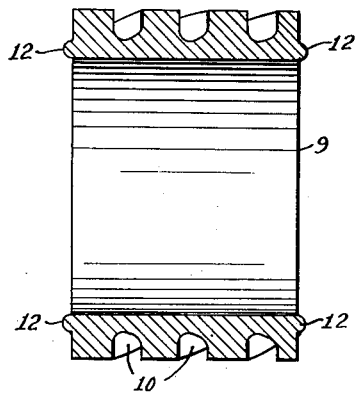
Figure 8:
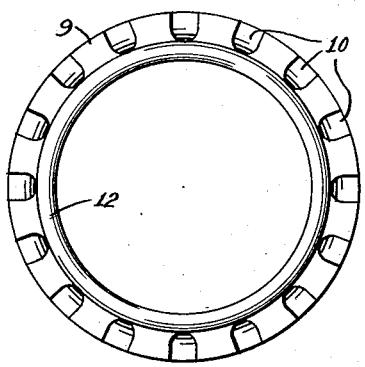
Figure 9:
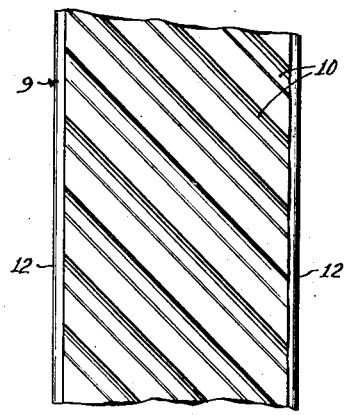

Figs. 7-9 illustrate the construction of the sleeve which contains the ball-return grooves; Fig. 7 being a longitudinal section through such sleeve; Fig. 8 an end view of it; and Fig. 9 a development of it.

Figure 1:
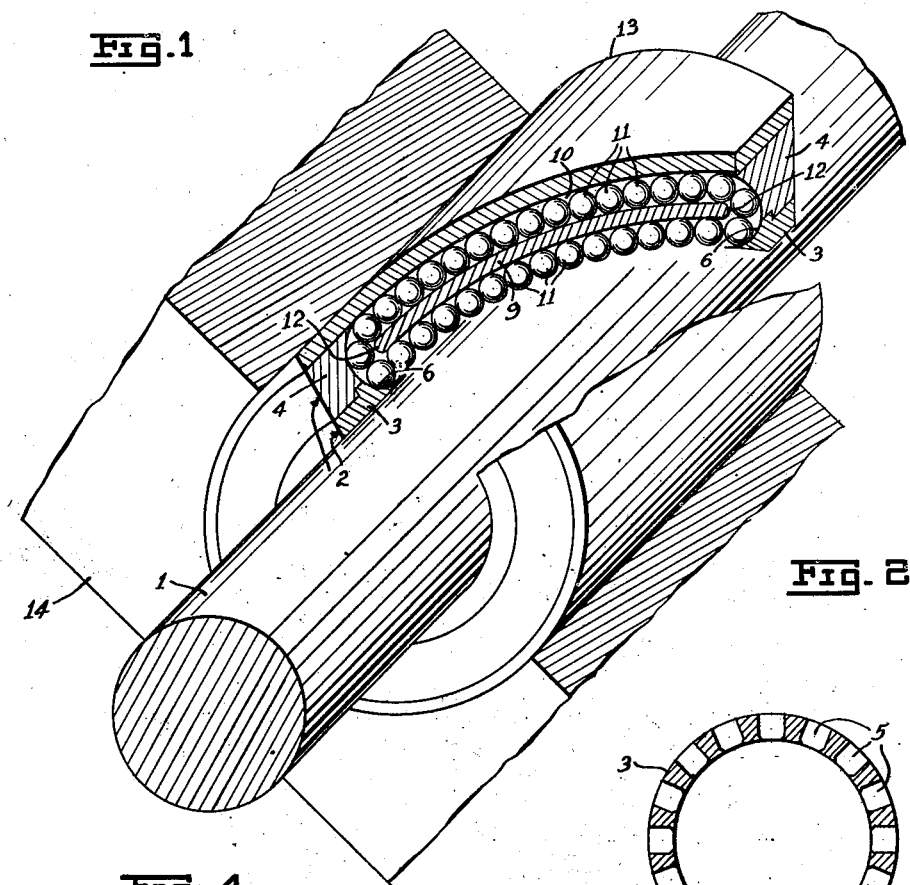

Referring first to Fig. 1, a shaft to be rotatably and slidably mounted in the ball bearing is represented at 1. The shaft fits loosely in a ball race member 2. This member comprises a sleeve-like portion 3 illustrated by itself in Figs. 2-4, and two end rings 4, one of which is illustrated by itself in longitudinal section in Fig. 5 and in side view in Fig. 6. The sleeve-like portion 3 of the race member will hereinafter be referred to as the race sleeve. The end rings 4 have a force fit on the ends of the race sleeve 3 or are otherwise secured to it so that they constitute in effect unitary parts of the race member.

Figure 2:
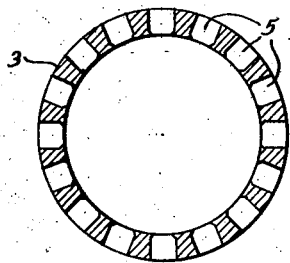
Figure 4:
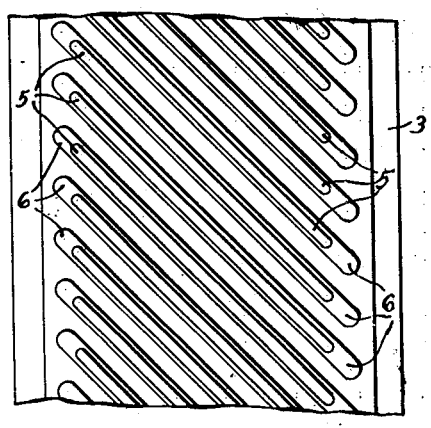
Figure 3:
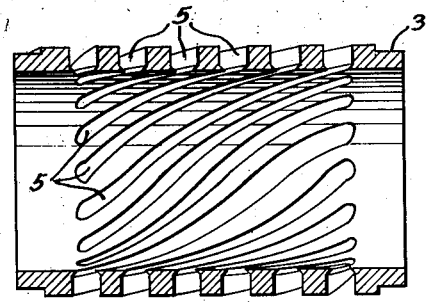

The race sleeve 3 is shown in longitudinal section in Fig. 3 and a development of the race sleeve is shown in Fig. 4. As shown in these figures the race sleeve has a number of individual parallel slots 5 constituting portions of ball races. These slots extend longitudinally of the sleeve but are disposed at an angle of 45° with respect to the sleeve axis. In other words, the slots extend spirally around the sleeve at an angle of 45° to the sleeve axis. Each slot is slightly narrower at the inner face of the race sleeve than at the outer face thereof, as best shown in Fig. 2. This prevents the bearing balls that are placed in

2 the slots during assembly of the bearing from dropping inwardly through them. The end walls of each slot are curved upwardly as shown at 6 in Figs. 1 and 4.

Figure 5:
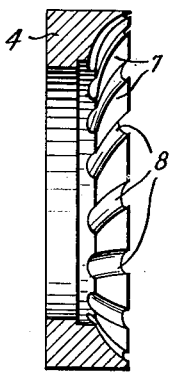
Fig. 5 is a longitudinal section through one of the end ball-guiding rings on the race member.
Figure 6:
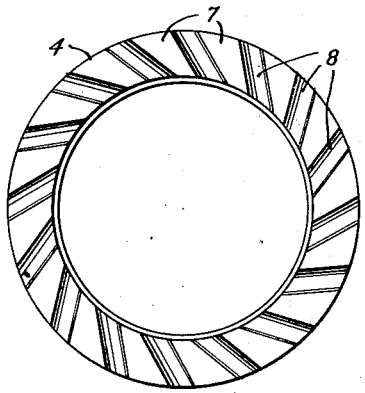
Fig. 6 is an inside face view of the ball-guiding ring shown in Fig. 5.

The inner corner of each end ring 4 nearest the race sleeve 3 is cut out to give it a concave shape, as shown at 7 in Fig. 5. The concave surface thus formed is provided with a series of ball-guiding grooves 8. There is one of such grooves for each of the slots 5 in the race sleeve and in the assembled bearing the inner ends of the grooves in the end rings register with the corresponding ends of the slots in the race sleeve 3 so that each groove in an end ring constitutes in effect a continuation of the ball race formed by the corresponding slot in the race sleeve. As best shown in Fig. 6 the grooves in the end rings are not truly radial but are obliquely disposed to line up with the spiral slots 5 in the race sleeve.

The race sleeve 3 fits within a shorter ball-return sleeve 9 which is illustrated by itself in Figs. 7-9. As shown in these figures the outer surface of the sleeve 9 has a number of individual spiral ball-return grooves 10 each of which is disposed at an angle of 45° with the sleeve axis. There is one of these grooves for each of the slots 5 in the race sleeve 3 and each ball-return groove in the sleeve 9 lies radially above and is parallel to one of the slots in the race sleeve. Each slot in the race sleeve and the corresponding overlying ball-return groove in the sleeve 9 are joined at one end by one of the oblique grooves 8 in one of the end rings 4 and at the other end are joined by one of the oblique grooves in the other end ring. Thus each slot in the race sleeve together with the corresponding overlying ball-return groove in the sleeve 9 and their interconnecting oblique grooves in the end rings 4 constitute an endless individual ball circuit. Each of these circuits is completely filled with antifriction balls 11 as shown in Fig. 1. The ball-return sleeve 9 is of such length that when the balls in each circuit progress as hereinafter described those balls that are rounding the ends of the ball-return sleeve and are being guided by the curved ends 6 of the slots 5 and by the grooves in the end rings 4 will clear the end portions 12 of the ball-return sleeve that lie inwardly of the ball-return grooves in the sleeve. These end portions 12 of the ball-return sleeve are convexed outwardly as shown in Figs. 1 and 7 so that the surfaces formed by them are substantially parallel to the curved end walls of the ball races, i. e., the curved end walls formed by the curved portions 6 at the ends of the slots 5 in the race sleeve plus the curved bottoms of the grooves in the end rings 4.

The ball-return sleeve 9 has a force fit within an outer sleeve 13 (Fig. 1) which closes over the open tops of the spiral grooves 10 in the outer surface of the ball-return sleeve. The outer sleeve 13 extends longitudinally beyond the opposite ends of the ball-return sleeve as shown in Fig. 1 and receives the end rings 4 on the race member with a force fit. Thus all parts of the bearing in which the balls move are in effect unitary but the unitary relationship could be achieved if desired by securing them together in any suitable way rather than by telescoping them with a force fit. The bearing is mounted in a housing represented at 14 and is held in fixed relation to it in any suitable way.

The antifriction balls 11 are of such size in relation to the thickness of the wall of the race sleeve 3 that those balls which at any time happen to be in the portions of the slots 5 that extend entirely through the wall of the race sleeve will make contact with the shaft 1 and also with the inner cylindrical surface of the ball-return sleeve 9. These are the load-carrying balls. Those balls which roll in contact with the curved ends 6 of the slots 5 as well as the balls guided in the grooves 8 of the end rings 4, and all of the balls in the return grooves 10 of the ball-return sleeve 9 carry no load and have free movement in their respective passages, it being understood that such passages are made large enough with respect to the size of the balls to permit their free movement. Also, it should be understood that the slots 5 in the race sleeve are slightly greater in width than the diameter of the balls to permit the balls to roll freely in the slots.

It will now be seen that the shaft 1 can either rotate in the bearing or can move rectilinearly in it, and no matter which type of movement takes place all of the load-carrying balls in the slots 5 in the race sleeve will be rolled along in contact with the surface of the shaft and with the inner surface of the ball-return sleeve 9. Rectilinear movement of the shaft will, of course, tend to roll the load-carrying balls in a truly lengthwise direction of the shaft, and rotation of the shaft will tend to roll the load-carrying balls in a truly circumferential direction. But since the slots in the sleeve 3 are disposed at an angle of 45° with respect to the axis of the shaft they will guide or deflect the load-carrying balls and cause them to roll along lengthwise of the slots regardless of whether the shaft moves rectilinearly in either direction or rotates in either direction. In any case the rolling of the load-carrying balls will cause all of the balls in the corresponding ball circuit to progress, the progression of the load-carrying balls in each ball circuit being in one direction and the progression of the balls in the corresponding ball-return groove in the sleeve 9 being in the opposite direction. Thus the load-carrying balls that are rolling out of one of the race slots 5 in the race sleeve 3 roll up into the corresponding ball-return passage 10 in the sleeve 9 and in so doing are guided by the corresponding ball-guiding groove in the end ring 4. A corresponding number of balls will roll downward from the opposite end of the ball-return groove into the corresponding end of the race slot in the race sleeve and in so doing will be guided by the corresponding groove in the other end ring 4.

In the foregoing description of the operation of the bearing it has been assumed that the rotary or sliding movement of the shaft is relative to the bearing, but it will be understood that the shaft may be stationary and the entire bearing including the housing may slide axially of the shaft or rotate about the shaft.

I claim:

1. A rotary and sliding ball bearing comprising a race member having a race sleeve adapted to loosely surround a shaft, a ball-return sleeve surrounding the race sleeve, the race sleeve having a number of spiral slots disposed at an angle of 45° with the axis of the sleeve, the ball-return sleeve having a smooth inner surface and having grooves in its outer surface each of which lies radially above one of the slots in the race sleeve and is parallel to it, and an outer sleeve surrounding said ball-return sleeve and covering said grooves in its outer surface, means at opposite ends of the race member for establishing a ball-guiding path from opposite ends of each slot in the race sleeve to opposite ends of the corresponding groove in the ball-return sleeve to thereby provide a number of endless ball circuits, all of said parts being held in fixed relation to one another, and antifriction balls completely filling each of such endless ball circuits, at least some of the balls in the slots in the race sleeve constituting load-carrying balls adapted when the bearing is assembled on a shaft to make rolling contact with the shaft and the inner surface of the ball-return sleeve.

2. A rotary and sliding ball bearing comprising a race member having a race sleeve adapted to loosely surround a shaft, a ball-return sleeve surrounding the race sleeve, the race sleeve having a number of spiral slots disposed at an angle of 45° with the axis of the sleeve, the ball-return sleeve having a smooth inner surface and having grooves in its outer surface each of which lies radially above one of the slots in the race sleeve and is parallel to it, rings fixed to opposite ends of the race sleeve and having grooves extending from opposite ends of each slot in the race sleeve to the opposite ends of the corresponding groove in the ball-return sleeve to thereby provide a number of endless ball circuits, an outer sleeve surrounding the ball-return sleeve and covering said grooves in its outer surface, said outer sleeve extending longitudinally beyond the opposite ends of the ball-return sleeve so as to overlie the rings fixed on the race sleeve, said portions of the outer sleeve that overlie said rings being fixed to them, and antifriction balls completely filling each of said endless ball circuits, at least some of the balls in the slots in the race sleeve constituting load-carrying balls adapted when the bearing is assembled on a shaft to make rolling contact with the shaft and the inner surface of the ball-return sleeve.

3. A rotary and sliding ball bearing comprising a race member having a race sleeve adapted to loosely surround a shaft, a ball-return sleeve surrounding the race sleeve, the race sleeve having a number of spiral slots disposed at an angle of 45° with the axis of the sleeve, the ball-return sleeve having a smooth inner surface and having grooves in its outer surface each of which lies radially above one of the slots in the race sleeve and is parallel to it, rings having a force fit on opposite ends of the race sleeve and having ball-guiding grooves extending from opposite ends of each slot in the race sleeve to the opposite ends of the corresponding groove in the ball-return sleeve to thereby provide a number of endless ball circuits, an outer sleeve surrounding the ball-return sleeve and having a force fit thereon and covering said grooves in its outer surface, said outer sleeve extending longitudinally beyond opposite ends of the ball-return sleeve so as to overlie the rings on the race sleeve, said portions of the outer sleeve that overlie said rings having a force fit on the rings, and antifriction balls completely filling each of said endless ball circiuts, at least some of the balls in the slots in the race sleeve constituting load-carrying balls adapted when the bearing is assembled on a shaft to make rolling contact with the shaft and the inner surface of the ball-return sleeve.

THEODORE F. SCHLICKSUPP.

REFERENCES CITED

The following references are of record in the file of this patent:

UNITED STATES PATENTS

| Number | Name | Date |
| --- | --- | --- |
| 782,347 | Lidback | Feb. 14, 1905 |
| 2,355,317 | Moore | Aug. 8, 1944 |

FOREIGN PATENTS

| Number | Country | Date |
| --- | --- | --- |
| 125,573 | Austria | 1931 |
| 755,957 | France | 1933 |